(12) United States Patent
Ibayashi et al.

(10) Patent No.: US 10,967,528 B2
(45) Date of Patent: Apr. 6, 2021

(54) MAINTENANCE JIG FOR BALANCER OF ROBOT

(71) Applicant: FANUC CORPORATION, Yamanashi (JP)

(72) Inventors: Jun Ibayashi, Yamanashi (JP); Takayuki Wakabayashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/540,660

(22) Filed: Aug. 14, 2019

(65) Prior Publication Data
US 2020/0070368 A1 Mar. 5, 2020

(30) Foreign Application Priority Data
Sep. 5, 2018 (JP) .............................. JP2018-166178

(51) Int. Cl.
*B25J 17/00* (2006.01)
*B25J 17/02* (2006.01)
(Continued)

(52) U.S. Cl.
CPC .......... *B25J 19/0066* (2013.01); *B25J 9/0009* (2013.01); *B25J 17/00* (2013.01); *B25J 19/0008* (2013.01)

(58) Field of Classification Search
CPC . B25J 19/0066; B25J 19/0008; B25J 19/0016
See application file for complete search history.

(56) References Cited

U.S. PATENT DOCUMENTS 2,995,327 A * 8/1961 Wood ................... F16L 3/2053
248/543
5,402,690 A * 4/1995 Sekiguchi ........... B25J 19/0016
248/280.11
(Continued)

FOREIGN PATENT DOCUMENTS

EP 2886265 A2 6/2015
JP H04086700 U 7/1992
(Continued)

OTHER PUBLICATIONS

Japanese Notice of Reasons for Refusal dated Oct. 6, 2020, for Japanese Patent Application No. 2018166178.
(Continued)

*Primary Examiner* — Jake Cook
(74) *Attorney, Agent, or Firm* — Karceski IP Law, PLLC (57) ABSTRACT

A maintenance jig for a balancer of a robot includes a balancer with a casing closed at both ends by two end plates, each having a through hole, a movable member disposed in the casing, movable in an axial direction of the casing, a rod, one end of which is fixed to the movable member and another end of which is disposed outside the casing, and a force generating member accommodated in the casing. The force generating member generates a pulling force that pulls the rod into the casing. The maintenance jig includes a first member detachably fixed to the other end plate, a second member includes a male screw portion to be fastened to a screw hole of the first member, and a rotational force input unit through which a rotational force is input.

3 Claims, 10 Drawing Sheets

(51) Int. Cl.
*B25J 18/00* (2006.01)
*B25J 19/00* (2006.01)
*B25J 9/00* (2006.01)

(56) References Cited

U.S. PATENT DOCUMENTS

| | | |
|---|---|---|
| 2007/0006755 A1 | 1/2007 | Zimmermann |
| 2008/0069679 A1* | 3/2008 | Shimada .................. B25J 9/106 |
| | | 414/744.5 |
| 2011/0239806 A1 | 10/2011 | Markert |
| 2015/0174770 A1 | 6/2015 | Kagawa |
| 2015/0246450 A1* | 9/2015 | Yoneda .................... B25J 17/00 |
| | | 74/490.05 |
| 2019/0321987 A1* | 10/2019 | Tanno .................. B25J 19/0016 |

FOREIGN PATENT DOCUMENTS

| | | |
|---|---|---|
| JP | H10225891 A | 8/1998 |
| JP | H11216697 A | 8/1999 |
| JP | 2002283274 A | 10/2002 |
| JP | 2006326727 A | 12/2006 |
| JP | 2011131815 A | 7/2011 |
| JP | 2011131945 A | 7/2011 |
| JP | 2012000703 A | 1/2012 |
| JP | 2015120205 A | 7/2015 |

OTHER PUBLICATIONS

Japanese Notice of Reasons for Refusal dated Jan. 5, 2021, for Japanese Patent Application No. 2018166178.

* cited by examiner

MAINTENANCE JIG FOR BALANCER OF ROBOT

CROSS-REFERENCE TO RELATED APPLICATIONS

This application is based on and claims priority to Japanese Patent Application No. 2018-166178, filed on Sep. 5, 2018, the entire content of which is incorporated herein by reference.

FIELD OF THE INVENTION

The present invention relates to a maintenance jig for a balancer of a robot.

BACKGROUND OF THE INVENTION

In a large vertical articulated robot, a balancer may be used to supplement the torque of a motor. When replacing a reduction gear at a joint equipped with the balancer, it is first necessary to remove the balancer. For that purpose, it is preferable to perform the removal in a state in which the posture of the robot is changed to a posture in which a force generated by the balancer is minimized. However, in the case where the reduction gear has broken down and locked, because the robot cannot be changed to a desired posture, the reduction gear must be removed at a position where the robot is at rest. After the reduction gear has been removed, it is preferable to return the two members constituting the joint to a normal assembly posture and perform the task of assembling the reduction gear.

There is known a jig for fixing the state of a balancer at an arbitrary position at which a robot has stopped (see, for example, Japanese Unexamined Patent Application, Publication No. 2002-283274). The jig of Japanese Unexamined Patent Application, Publication No. 2002-283274 is basically a jig for preventing an arm from falling off when removing a motor by fixing the state of the balancer at an arbitrary position at which the robot has stopped.

SUMMARY OF THE INVENTION

According to an aspect of the present invention, in a maintenance jig for a balancer of a robot, the balancer including a casing that has cylindrical shape and that is closed at both ends by two end plates each having a through hole that passes through in a thickness direction, a movable member disposed in the casing so as to be movable in the axial direction of the casing, a rod that has one end, which is fixed to the movable member, and that has another end, which is disposed outside the casing through the through hole of one of the end plates, and a force generating member that is accommodated in the casing and that generates a pulling force that pulls the rod into the casing in accordance with the amount of movement of the movable member, said maintenance jig includes: a first member that includes a screw hole, that is detachably fixed to the other end plate, and that is disposed at a position corresponding to the through hole of the other end plate; and a second member that is long, that includes a male screw portion to be fastened to the screw hole, and that has a distal end that abuts against the movable member by being passed through the through hole of the other end plate, in which the second member includes a rotational force input portion through which a rotational force about a longitudinal axis is input.

In the above aspect, the screw hole and the male screw may be trapezoidal screws.

In the above aspect, a friction reducing portion that reduces sliding friction against the movable member may be disposed at the distal end of the second member.

In the above aspect, the friction reducing portion may be a thrust bearing.

DESCRIPTION OF EMBODIMENT(S) OF THE INVENTION

A maintenance jig 1 for a balancer 200 of a robot 100 according to an embodiment of the present invention will be described below with reference to the drawings.

Figure 1:
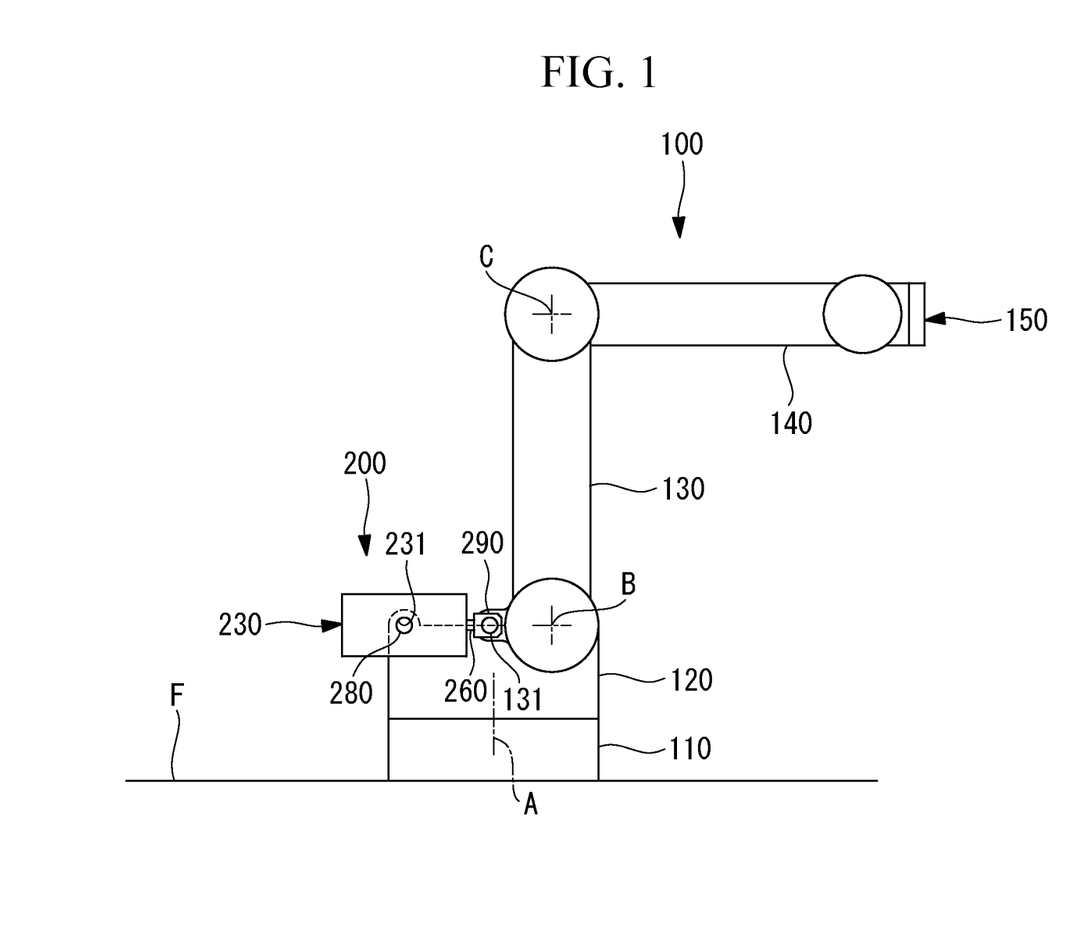
FIG. 1 is a schematic side view illustrating an example of a normal assembly posture of a robot using a maintenance jig according to an embodiment of the present invention.
Figure 2:
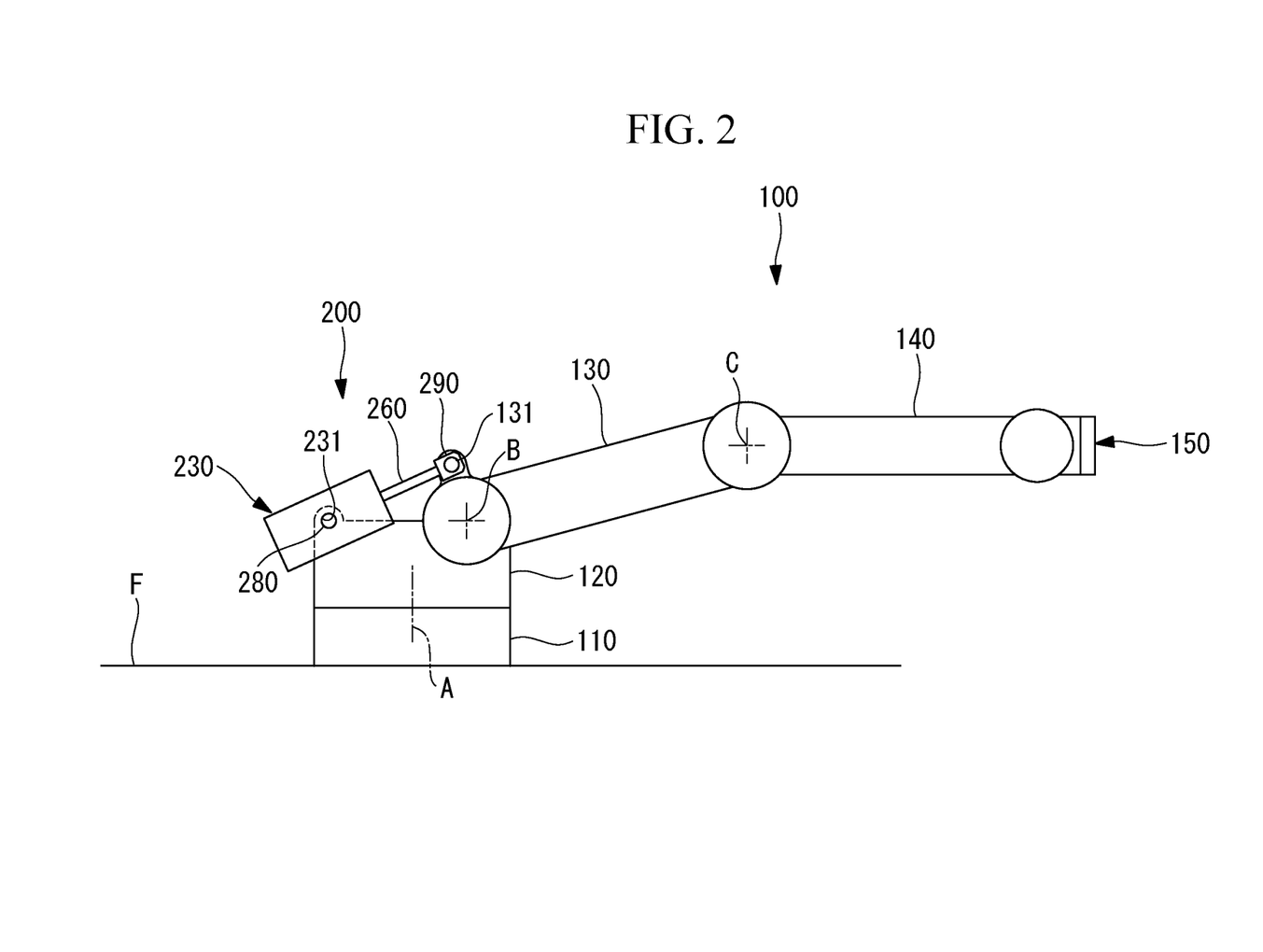
FIG. 2 is a schematic side view illustrating a state in which a first arm of the robot in FIG. 1 is tilted forward.
Figure 3:
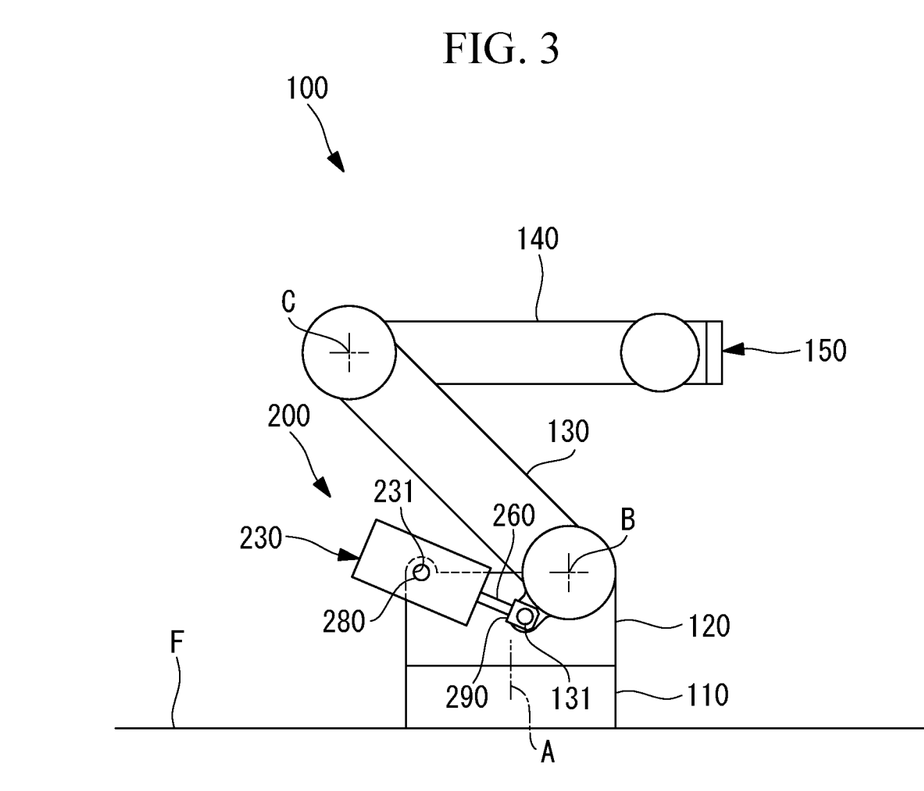
FIG. 3 is a schematic side view illustrating a state in which the first arm of the robot in FIG. 1 is tilted rearward.

The maintenance jig 1 according to the present embodiment is a jig for the balancer 200 provided in the robot 100, which is of the vertical articulated type, as illustrated in FIGS. 1 to 3.

The robot 100 includes, for example, as illustrated in FIGS. 1 to 3, a base 110 installed on a floor F, a turning body (component) 120 supported by the base 110 so as to be rotatable about a first vertical axis A, a first arm (component) 130 supported so as to be rotatable relative to the turning body 120 about a horizontal second axis B, a second arm 140 supported so as to be rotatable relative to the first arm 130 about a third axis C parallel to the second axis B, and a wrist unit 150 supported at the distal end of the second arm 140.

In the present embodiment, the balancer 200 is attached between the turning body 120 and the first arm 130.

Figure 4:
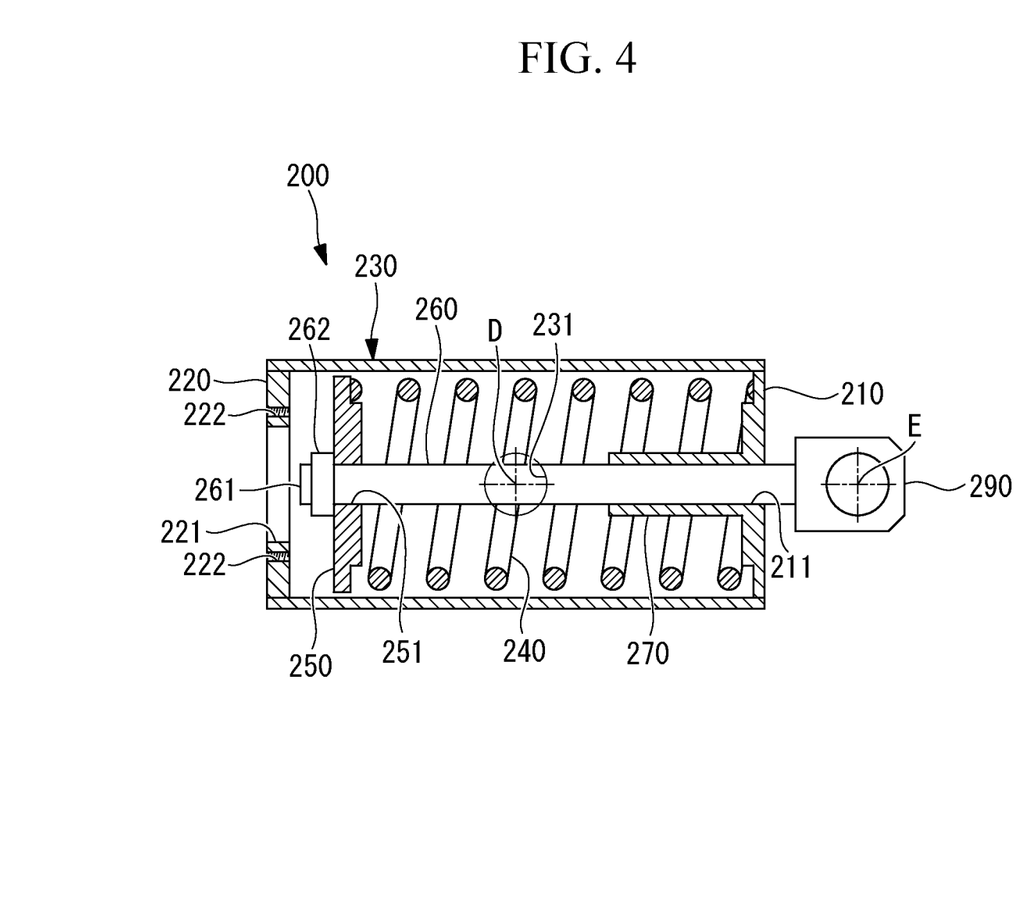
FIG. 4 is a longitudinal sectional view illustrating an example of a balancer provided in the robot of FIG. 1.

The balancer 200, as illustrated in FIG. 4, is formed by housing a compression coil spring (force generating member) 240 and a movable plate (movable member) 250 in a casing 230 that has cylindrical shape and that is closed at both ends by end plates 210 and 220, fixing the movable plate 250 to one end of a rod 260 which passes through the compression coil spring 240 in the axial direction, and disposing the other end of the rod 260 outside the casing 230 by passing it through a center hole (through hole) 211 provided in the end plate 210 on the compression coil spring 240 side. In the figure, reference sign 270 denotes a sleeve that is provided on the end plate 210 and that supports the movement of the rod 260.

The end plate 220 is provided with an opening portion (through hole) 221 that passes through the center thereof in the thickness direction, and, in an area surrounding the opening portion 221, a plurality of screw holes 222 that are disposed at intervals in the circumferential direction and that are for fixing a fixing member 2 (described later) to the end plate 220 are provided.

At the other end of the rod 260, a male screw 261 to which a nut 262 is to be fastened is provided. The movable plate 250 is formed in a disk shape, and a through hole 251 through which the rod 260 is inserted is provided at the center of the movable plate 250. The movable plate 250 is securely fixed to the other end of the rod 260 by fastening the nut 262 to the male screw 261 that passes through the through hole 251.

The outer surface of the casing 230 is provided with a fitting hole 231 for fitting a first shaft 280 extending perpendicularly to the axial direction of the casing 230 so as to enable the first shaft 280 to rotate about an axis D. The first shaft 280 is attached to the turning body 120 and is parallel to and horizontally spaced apart from the second axis B.

In the first arm 130, a second shaft 131 is provided extending along an axis E that is parallel to and spaced apart from the second axis B, and another end 290 of the rod 260 is attached to the second shaft 131 so as to be rotatable. The second shaft 131 is disposed at a position that is parallel to and spaced apart from the second axis B, and is located between the second axis B and the first shaft 280 when the first arm 130 is disposed in a substantially vertically extending posture (normal assembly posture) as illustrated in FIG. 1.

Consequently, as illustrated in FIGS. 2 and 3, when the first arm 130 rotates about the second axis B, as the second shaft 131 translates around the second axis B, the distance between the second shaft 131 and the first shaft 280 changes. Consequently, the rod 260 of the balancer 200 is pushed and pulled in the axial direction.

Figure 5:
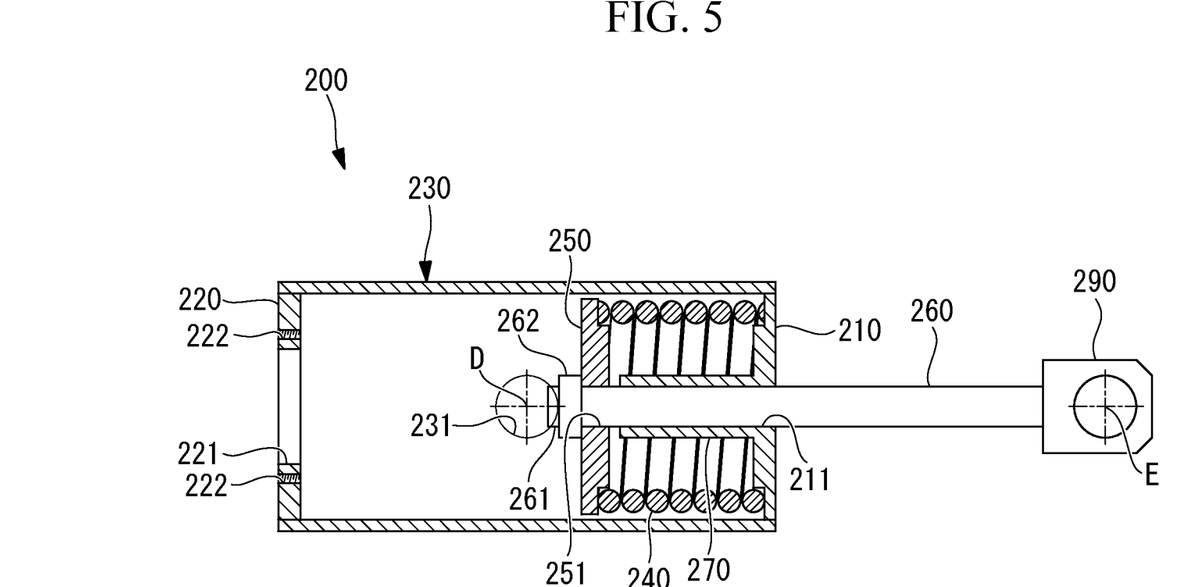
FIG. 5 is a longitudinal sectional view illustrating a state in which the compression coil spring of the balancer in FIG. 4 is compressed.

As illustrated in FIG. 2, in order to rotate the first arm 130 in a direction in which the first arm 130 pulls back rearward from the state in which the first arm 130 is tilted forward about the second axis B, and as illustrated in FIG. 3, in order to rotate the first arm 130 in a direction in which the first arm 130 pulls back forward from the state in which the first arm 130 is tilted rearward about the second axis B, a motor (not illustrated) that drives the first arm 130 needs to generate a torque that overcomes the moment generated by the weight of the member on the distal end side of the first arm 130. When the first arm 130 rotates about the second axis B in a forward or rearward direction, as illustrated in FIG. 5, the rod 260 of the balancer 200 is pulled in a direction in which the rod is pulled out of the casing 230, the movable plate 250 fixed to one end of the rod 260 moves in the casing 230, and the compression coil spring 240 sandwiched between the movable plate 250 and the end plate 210 is compressed.

Consequently, due to the elastic restoring force of the compression coil spring 240, a force (retraction force) is generated in a direction in which the rod 260 is pulled into the casing 230, and a moment acts on the first arm 130 in a direction in which the first arm 130 is pulled back to a position perpendicular to the second axis B. That is, the load on the motor is reduced by the balancer 200.

Figure 6:
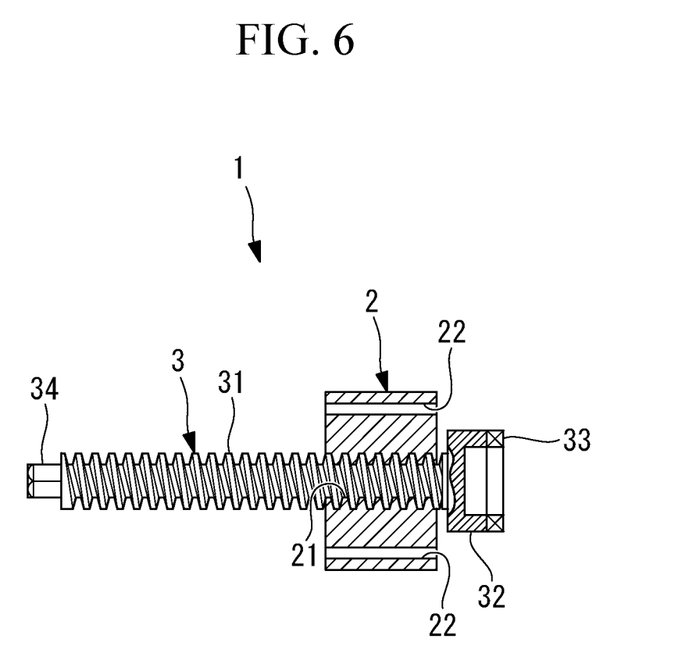
FIG. 6 is a longitudinal sectional view illustrating a maintenance jig for a balancer of a robot according to an embodiment of the present invention.

The maintenance jig 1 according to the present embodiment includes, as illustrated in FIG. 6, the fixing member (first member) 2 fixed to the end plate 220 of the balancer 200, and a movable member (second member) 3 supported so as to be movable relative to the fixing member 2.

Figure 8:
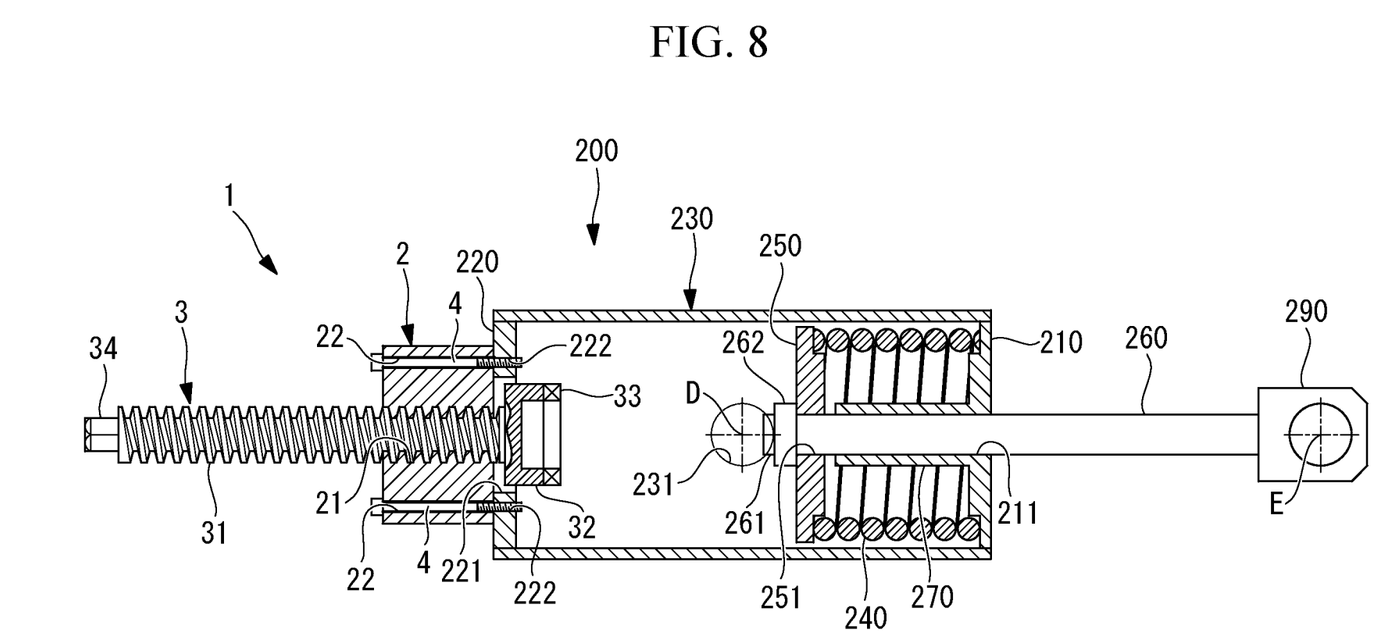
FIG. 8 is a longitudinal sectional view illustrating a state in which the maintenance jig in FIG. 6 is attached to the balancer in the state in FIG. 5.

The fixing member 2 is formed in a cylindrical shape, and a female screw composed of a trapezoidal screw is formed on the inner surface of a center hole (screw hole) 21 thereof. In the fixing member 2, in a state where the center hole 21 is aligned with the opening portion 221 of the end plate 220 of the balancer 200, through holes 22 that pass through in the axial direction are provided at positions respectively corresponding to the screw holes 222 of the end plate 220. As illustrated in FIG. 8, by fastening bolts 4 through the through holes 22 to the screw holes 222 of the end plate 220, it is possible to align the center hole 21 with the opening portion 221 and fix the fixing member 2 to the end plate 220.

The movable member 3 is a columnar member and is provided with a male screw (male screw portion) 31 composed of a trapezoidal screw fastened on the outer peripheral surface to the female screw of the center hole 21. The movable member 3 includes, at one end, a cup-shaped member 32 disposed at a position covering the nut 262 and a thrust bearing (friction reducing portion) 33 disposed at the distal end of the cup-shaped member 32. The thrust bearing 33 has an inner diameter larger than the outer diameter of the nut 262.

The other end of the movable member 3 is provided with a hexagonal head (rotational force input portion) 34 through which a rotational force around the axis can be applied to the movable member 3 with a tool such as a spanner.

The operation of the maintenance jig 1 of the balancer 200 of the robot 100 according to the present embodiment configured as described above will be described below.

Maintenance of the balancer 200 of the robot 100 using the maintenance jig 1 according to the present embodiment is performed, for example, as illustrated in FIG. 2 or FIG. 3, in the case where the robot 100, in a posture other than the normal assembly posture, has stopped and locked due to a cause such as a defect in the reduction gear.

In such a state, the compression coil spring 240 in the casing 230 is compressed, and a large force acts on the rod 260 in a direction in which the rod 260 is pulled back into the casing 230. Therefore, if replacement of the reduction gear is attempted in this state, the connection between the turning body 120 and the first arm 130 is released, and the force exerted by the balancer 200 acting in a direction in which the first shaft 280 and the second shaft 131 are pulled back causes problems such as breakage of parts. Of course, it is difficult to remove the balancer 200 from between the first shaft 280 and the second shaft 131 in a state where a large force is being applied to the rod 260 by the compression coil spring 240.

Figure 7:
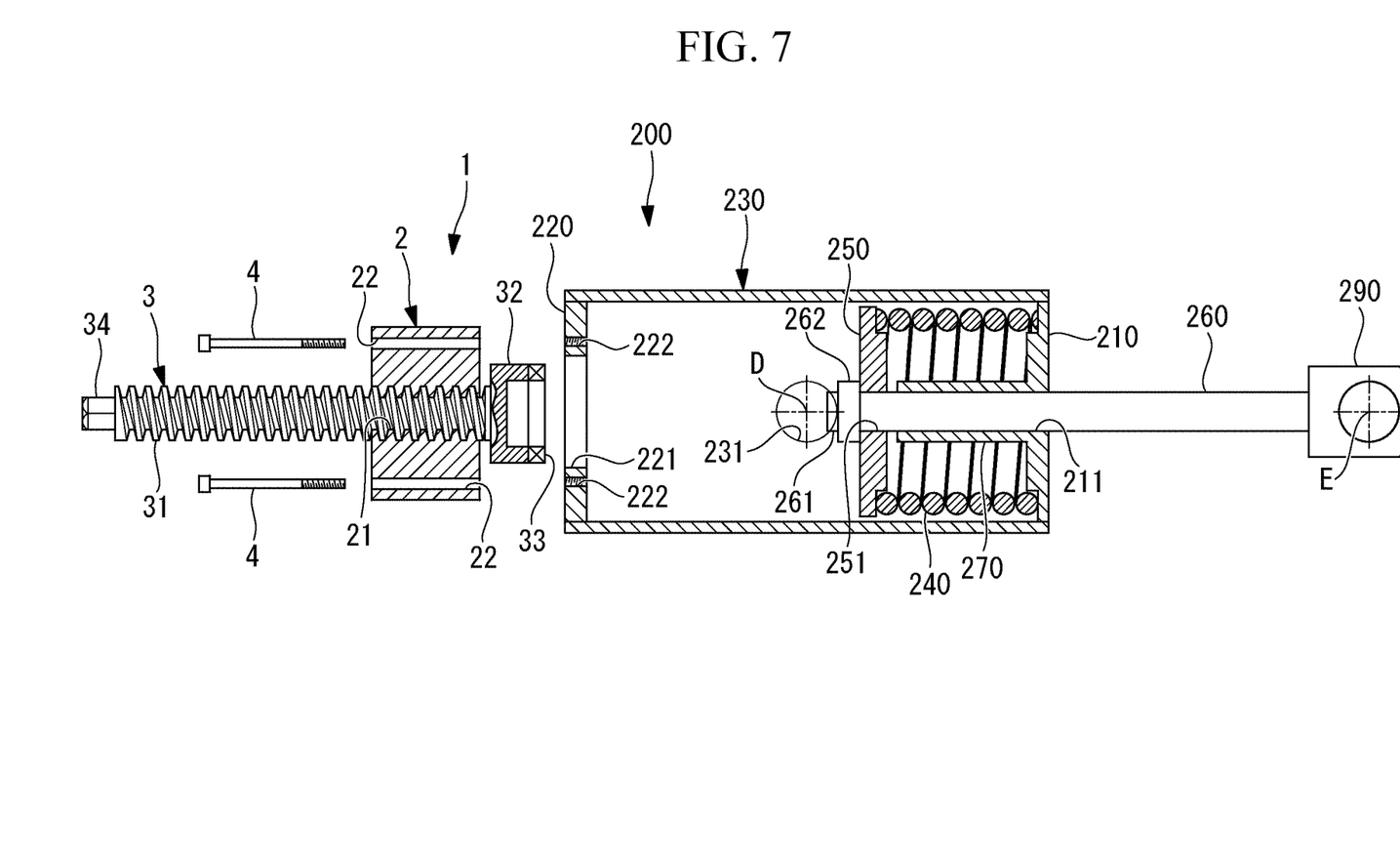
FIG. 7 is a longitudinal sectional view for explaining a state in which the maintenance jig in FIG. 6 is attached to the balancer in the state in FIG. 5.

To use the maintenance jig 1 according to the present embodiment, as illustrated in FIGS. 7 and 8, the maintenance jig 1 is fixed to the end plate 220 of the casing 230 by the bolts 4.

That is, the fixing member 2 is fixed to the end plate 220 by aligning the center hole 21 of the fixing member 2 with the opening portion 221 of the end plate 220, inserting the thrust bearing 33 at the end of the movable member 3 and the cup-shaped member 32 into the casing 230 from the opening portion 221, and fastening the bolts 4 through the through holes 22 of the fixing member 2 to the screw holes 222 of the end plate 220.

Figure 9:
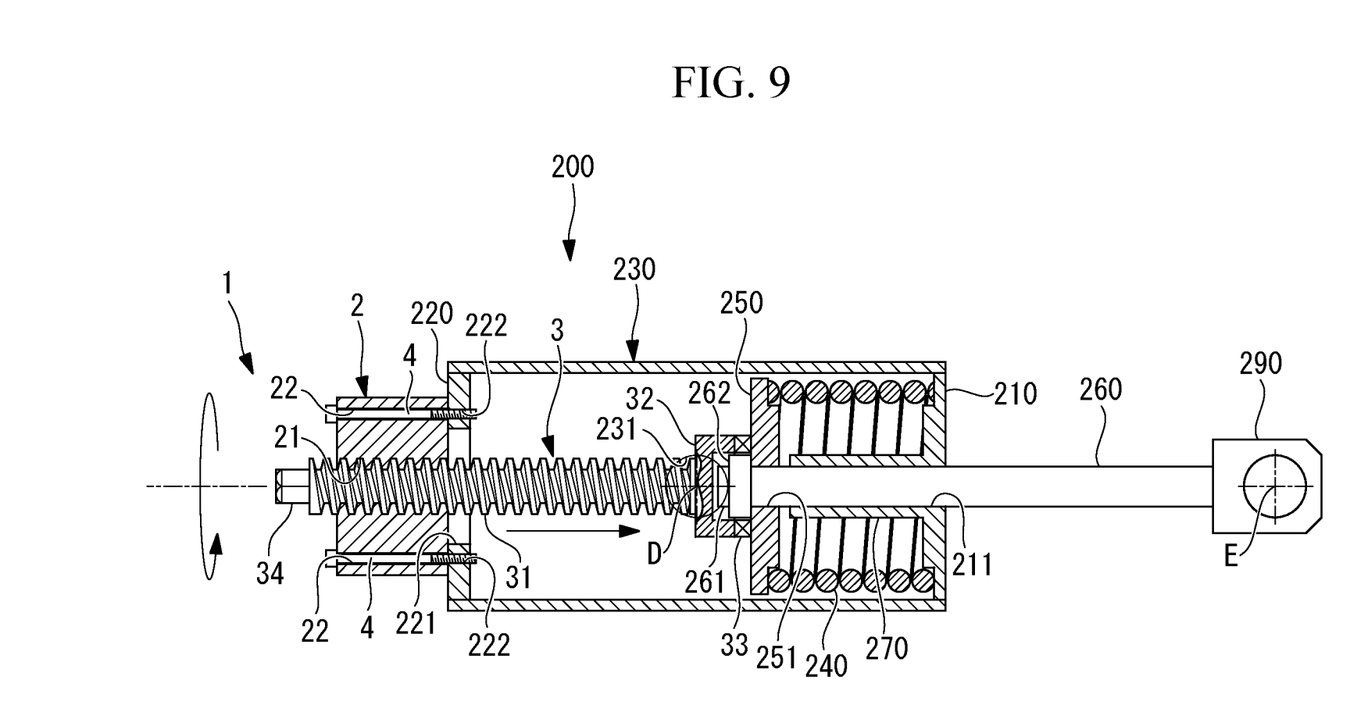
FIG. 9 is a longitudinal sectional view illustrating a state in which a thrust bearing is brought into contact with a movable plate by operating the maintenance jig from the state in FIG. 8.

Next, as illustrated in FIG. 9, the hexagonal head 34 is used for applying an axial rotational force to the movable member 3. Consequently, while the movable member 3 is rotated about the axis, the movable member 3 is moved in the axial direction with respect to the fixing member 2 by means of the lead of the male screw 31.

When the movable member 3 is moved relative to the fixing member 2 in a direction toward the distal end of the movable member 3, as illustrated in FIG. 9, the cup-shaped member 32 disposed at the distal end of the movable member 3 is disposed at a position covering the nut 262 that fixes the rod 260 to the movable plate 250, and the thrust bearing 33 at the distal end of the cup-shaped member 32 is brought into contact with the movable plate 250 radially outward of the nut 262. Then, when a rotational force is further applied in the same direction from the state where the thrust bearing 33 contacts the movable plate 250, the movable plate 250 is pressed by the thrust bearing 33 in a direction in which the compression coil spring 240 is further compressed.

In this case, by rotating the movable member 3, although the force transmitted from the movable member 3 to the movable plate 250 via the cup-shaped member 32 and the thrust bearing 33 increases, sliding friction due to relative rotation of the cup-shaped member 32 and the movable plate 250 about the axis of the movable member 3 is reduced due to the thrust bearing 33 disposed between the cup-shaped member 32 and the movable plate 250. Thus, the force applied from the maintenance jig 1 to the movable plate 250 can be smoothly increased by rotating the movable member 3 smoothly.

With the female screw provided in the center hole 21 of the fixing member 2 and the male screw 31 provided on the movable member 3 each being formed of a trapezoidal screw, a pressing force can be generated to balance the large force generated by the compression coil spring 240, and the generated pressing force can be smoothly increased or decreased.

Then, the rotation of the movable member 3 is stopped at a position where the force applied to the movable plate 250 by the maintenance jig 1 is in balance with the force applied from the compression coil spring 240 to the movable plate 250. Consequently, because an axial force does not act on the rod 260 of the balancer 200, the second shaft 131 can be easily removed from the rod 260.

Figure 10:
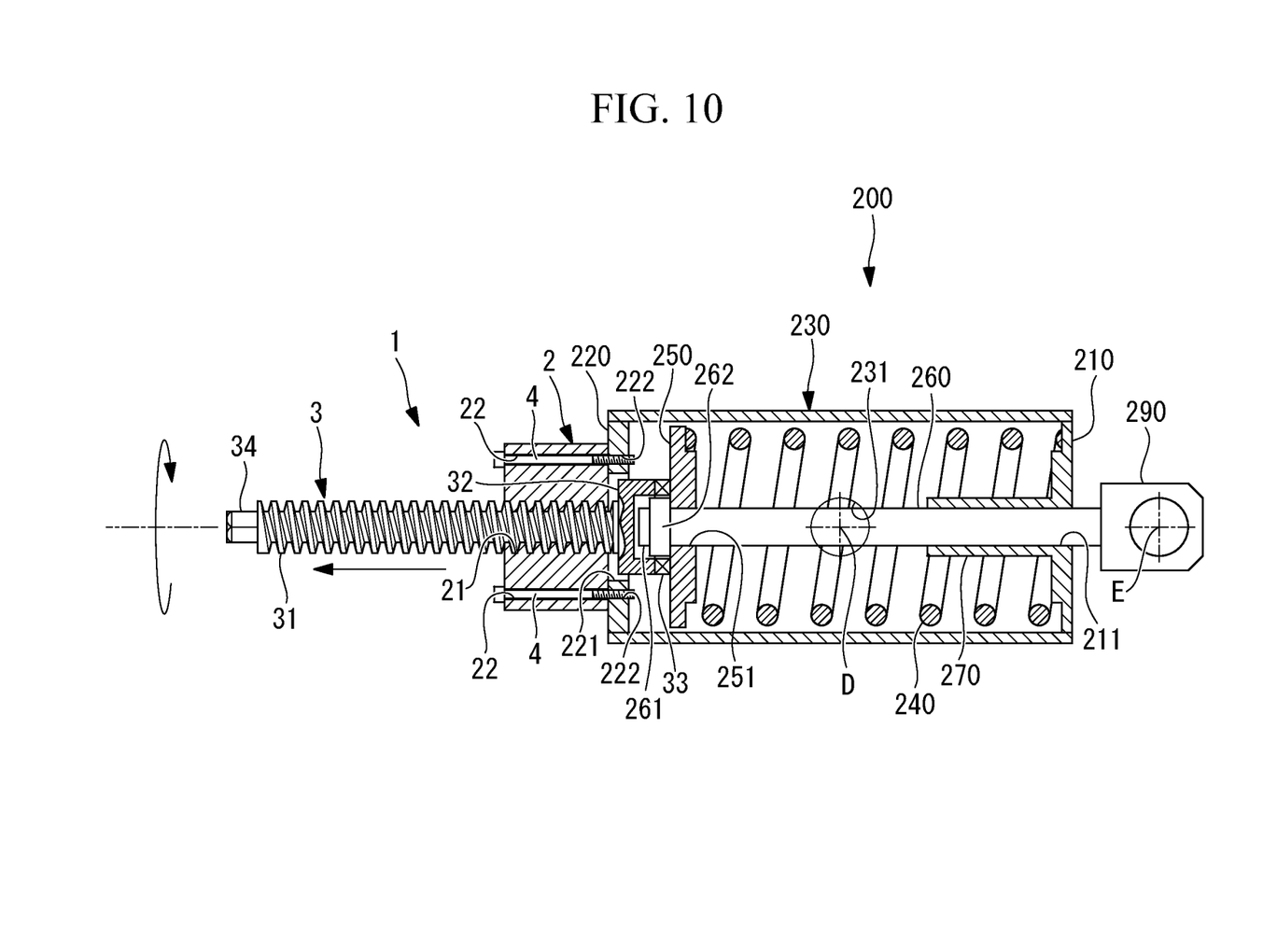
FIG. 10 is a longitudinal sectional view for explaining a state in which the maintenance jig is operated from the state in FIG. 9 to extend the compression coil spring.

After removing the second shaft 131 from the rod 260, as illustrated in FIG. 10, the movable member 3 is moved in the direction in which the movable member 3 is pulled out from the casing 230 by applying, to the hexagonal head 34, a rotational force in the opposite direction to that mentioned above. Consequently, the compression coil spring 240 extends, and the rod 260 is pulled into the casing 230. Then, by sufficiently extending the compression coil spring and bringing the movable plate 250 into contact with the end plate 220 or the distal end of the bolts 4, the nut 262 can be removed, and the balancer 200 loses the elastic force of the compression coil spring 240 and becomes suitable for the operator to handle.

That is, since a large elastic force is generated in a state where the compression coil spring 240 is compressed, it is not desirable for the elastic force to be released for some reason when the operator is handling the balancer 200. According to the maintenance jig 1 of the present embodiment, the compressed state of the compression coil spring 240 can be easily eliminated.

With this state, the balancer 200 can be easily removed from the first shaft 280, and the balancer 200 can be made suitable for assembly.

After the balancer 200 has been removed, the turning body 120 and the first arm 130 can be separated by removing the reduction gear between the turning body 120 and the first arm 130. The first arm 130 that has been separated from the turning body 120 is, as illustrated in FIG. 1, combined with the turning body 120 in a state in which the turning body 120 has been moved to a vertically extending normal assembly posture by the operation of a crane or the like. Thereby, the assembly work of the reduction gear can be performed in the normal assembly posture.

By carrying out the task of assembling the reduction gear in the normal assembly posture, the balancer 200 also has an advantage that it can be assembled without generating an elastic force in the compression coil spring 240 at the position where the first shaft 280 and the second shaft 131 are closest to each other.

Thus, according to the maintenance jig 1 for the balancer 200 of the robot 100 according to the present embodiment, in the case where the reduction gear has broken down and locked, the balancer 200 can be easily removed at any position where the robot 100 has stopped, and there is an advantage that the robot 100 can be returned to the normal assembly posture to easily perform the assembly work of the reduction gear.

In the present embodiment, the robot 100 in which the first shaft 280 and the second shaft 131 are closest to each other and the force generated by the balancer 200 is the smallest in the normal assembly posture in which the first arm 130 is disposed in the vertical direction is exemplified. Usually, the compression coil spring 240 is designed to generate a certain amount of elastic force even in this normal assembly posture. For example, in the case where the robot 100 is configured such that the nut 262, the movable plate 250 and the rod 260 are joined by welding or are integrally formed by machining, or the like, although it is necessary to compress the compression coil spring 240 when assembling the balancer 200 even in the normal assembly posture, by using the maintenance jig 1 according to this embodiment, the compression coil spring 240 can be easily compressed to a state suitable for assembly even in such a case.

Not only when the first arm 130 is correctly disposed in the vertical direction, but also when it is disposed in a posture slightly offset from the vertical direction, use of the maintenance jig 1 according to this embodiment has an advantage that the balancer 200 can be easily assembled.

In the present embodiment, the compression coil spring 240 is illustrated as a force generating member, but instead, another elastic body may be adopted, or a gas or liquid sealed in the casing 230 may be adopted.

Although the maintenance jig 1 for the balancer 200 disposed between the turning body 120 and the first arm 130 is illustrated, it may be used for a balancer 200 provided at another joint.

Although the thrust bearing 33 is exemplified as the friction reducing portion disposed at the distal end of the movable member 3, the present invention is not limited to this. The friction reducing portion need not be provided, or a friction reducing portion such as a tetrafluoroethylene resin coating may be employed.

Although the male screw 31 and female screw formed of trapezoidal screws fastening together the fixing member 2 and the movable member 3 are provided, the present invention is not limited to trapezoidal screws, and any type of male screw and female screw may be employed.

Although the casing 230 that has cylindrical shape and that is closed at both ends by the end plates 210 and 220 was exemplified as the balancer casing, alternatively, the three components need not be separated, and some or all may be integrated.

As a result, the following aspect is derived from the above described embodiment.

According to an aspect of the present invention, in a maintenance jig for a balancer of a robot, the balancer including a casing that has cylindrical shape and that is closed at both ends by two end plates each having a through hole that passes through in a thickness direction, a movable member disposed in the casing so as to be movable in the axial direction of the casing, a rod that has one end, which is fixed to the movable member, and that has another end, which is disposed outside the casing through the through hole of one of the end plates, and a force generating member that is accommodated in the casing and that generates a pulling force that pulls the rod into the casing in accordance with the amount of movement of the movable member, said maintenance jig includes: a first member that includes a screw hole, that is detachably fixed to the other end plate, and that is disposed at a position corresponding to the through hole of the other end plate; and a second member that is long, that includes a male screw portion to be fastened to the screw hole, and that has a distal end that abuts against the movable member by being passed through the through hole of the other end plate, in which the second member includes a rotational force input portion through which a rotational force about a longitudinal axis is input.

According to this aspect, by relatively rotating the components that form the robot's joints, when the rod of the balancer protrudes from the casing, the pulling force on the rod exerted by the force generating member increases, and auxiliary torque increases in a direction for reversing the rotation of the components. In the case where the reduction gear becomes locked due to breakage while the balancer is generating auxiliary torque in this way, the first member is fixed to the other end plate of the balancer, that is, the end plate opposite to the end plate from which the rod protrudes, and the screw holes are aligned with the through holes of the end plates.

Then, the male screw of the second member is fastened to the screw hole of the first member, and a rotational force in one direction about the longitudinal axis is input from the rotational force input unit to the second member with respect to the first member. As a result, the second member, while rotating in one direction about the longitudinal axis with respect to the first member, moves forward in the longitudinal direction and the distal end thereof abuts against the movable member inside the casing through the through hole of the end plate. The balancer can be easily removed from the robot by rotating the second member until the force with which the second member presses the movable member balances the force with which the force generating member presses the movable member.

After the balancer has been removed from the robot, the second member is moved rearward in the longitudinal axis direction by rotating the second member in the reverse direction with respect to the first member. Consequently, the movable member can be gradually moved rearward in the longitudinal axis direction, the force of the force generating member can be gradually reduced, and finally, the distal end of the second member can be retracted to a position away from the movable member. In this state, by removing the first member from the end plate, the balancer can be returned to a state suitable for assembly where no force is generated.

Then, with the reduction gear removed and the components separated, by disposing the robot in the normal assembly posture, the task of assembling the reduction gear and the task of assembling the balancer can be easily performed in the normal assembly posture.

That is, according to this aspect, in the case where the reduction gear has broken down and locked, the balancer can be easily removed at the position where the robot has stopped, and the robot can be returned to the normal assembly posture to carry out the task of assembling the reduction gear and the balancer.

In the above aspect, the screw hole and the male screw may be trapezoidal screws.

According to this configuration, a large force generated by the force generating member can be reliably received by the trapezoidal screws, and the movable member can be moved stably.

In the above aspect, a friction reducing portion that reduces sliding friction against the movable member may be disposed at the distal end of the second member.

According to this configuration, with the distal end of the second member pressed against the movable member, when a rotational force is applied by the rotational force input unit, although the distal end of the second member is made to slide on the surface of the movable member, due to the sliding friction being reduced by the friction reducing portion, smooth sliding is possible, and the movable member can be moved smoothly.

In the above aspect, the friction reducing portion may be a thrust bearing.

According to this configuration, with the friction reducing portion formed of a thrust bearing, relative rotation between the movable member and the second member can be smoothly performed while transmitting a large axial force between the movable member and the second member.

The invention claimed is:

1. A maintenance jig for a balancer of a robot, the balancer including a casing that has a cylindrical shape and that is closed at both ends by two end plates, each having a through hole that passes through in a thickness direction, a movable member disposed in the casing so as to be movable in an axial direction of the casing, a rod that has one end, which is fixed to the movable member, and that has another end, which is disposed outside the casing through the through hole of one of the end plates, and a force generating member that is accommodated in the casing and that generates a pulling force that pulls the rod into the casing in accordance with an amount of movement of the movable member, said maintenance jig comprising:
   a first member that is detachably fixed to the other end plate and that includes a screw hole disposed at a position corresponding to the through hole of the other end plate; and
   a second member that is elongated, that includes a male screw portion to be fastened to the screw hole, and that has a distal end that abuts against the movable member by being passed through the through hole of the other end plate; and
   a friction reducing portion disposed at the distal end of the second member,
   wherein the second member includes a rotational force input unit through which a rotational force about a longitudinal axis is input, and
   wherein the friction reducing portion reduces a sliding friction with respect to the movable member.

2. The maintenance jig for a balancer of a robot according to claim 1, wherein the screw hole and the male screw are trapezoidal screws.

3. The maintenance jig for a balancer of a robot according to claim 1, wherein the friction reducing portion is a thrust bearing.

* * * * *